United States Patent
Menke, Sr.

(10) Patent No.: US 7,360,911 B2
(45) Date of Patent: Apr. 22, 2008

(54) OSCILLATING BELT AND PULLEY DRIVE SYSTEM FOR HIGH PERFORMANCE LIGHT EMITTING DIODE WARNING LIGHT ASSEMBLY

(75) Inventor: W. Kenneth Menke, Sr., Glendale, MO (US)

(73) Assignee: PowerArc, Inc., Shrewsbury, MO (US)

( * ) Notice: Subject to any disclaimer, the term of this patent is extended or adjusted under 35 U.S.C. 154(b) by 310 days.

(21) Appl. No.: 11/036,659

(22) Filed: Jan. 14, 2005

(65) Prior Publication Data

US 2005/0122722 A1    Jun. 9, 2005

Related U.S. Application Data

(63) Continuation-in-part of application No. 10/713,308, filed on Nov. 14, 2003, now Pat. No. 7,131,757.

(51) Int. Cl.
*F21V 21/30* (2006.01)

(52) U.S. Cl. .................. 362/35; 362/287; 362/427

(58) Field of Classification Search ............. 362/287, 362/427, 282, 283, 284, 35; 474/84, 85–89
See application file for complete search history.

(56) References Cited

U.S. PATENT DOCUMENTS

| | | | | |
|---|---|---|---|---|
| 2,717,545 A | * | 9/1955 | Engeler et al. ............... 355/84 |
| 2,814,029 A | | 11/1957 | McRea | |
| 4,097,917 A | * | 6/1978 | McCaslin ................... 362/565 |
| 4,344,117 A | * | 8/1982 | Niccum ...................... 362/250 |
| 4,526,050 A | | 7/1985 | Johnson | |
| 4,896,809 A | * | 1/1990 | Koyanagi ................... 226/188 |
| 4,922,727 A | * | 5/1990 | Viegas ........................ 62/239 |
| 5,046,375 A | | 9/1991 | Salisbury, Jr. et al. | |
| 5,057,985 A | * | 10/1991 | Kreutzer et al. ............ 362/425 |
| 5,339,224 A | * | 8/1994 | Woehler ...................... 362/35 |
| 5,385,062 A | * | 1/1995 | Menke ......................... 74/54 |
| 5,426,417 A | * | 6/1995 | Stanuch ...................... 340/473 |
| 5,481,441 A | * | 1/1996 | Stevens ....................... 362/35 |
| 5,584,560 A | * | 12/1996 | Gosswiller et al. ......... 362/524 |
| 5,607,217 A | * | 3/1997 | Hobbs, II ..................... 362/35 |
| 5,664,865 A | | 9/1997 | Menke | |
| 5,676,447 A | | 10/1997 | Menke | |
| 5,816,034 A | * | 10/1998 | Peter ............................ 56/11.4 |
| 5,832,703 A | * | 11/1998 | Evans ........................... 56/11.4 |
| 5,842,768 A | | 12/1998 | Menke | |
| 6,068,566 A | * | 5/2000 | Kim ............................. 474/84 |
| 6,081,191 A | | 6/2000 | Green et al. | |
| RE36,790 E | | 7/2000 | Jincks et al. | |
| 6,210,023 B1 | * | 4/2001 | Evans ......................... 362/284 |
| 6,247,374 B1 | | 6/2001 | Tseng | |
| 6,247,832 B1 | | 6/2001 | Neustadt | |
| 6,271,630 B1 | | 8/2001 | Yahraus | |
| 6,318,886 B1 | | 11/2001 | Stopa et al. | |
| 6,352,357 B1 | * | 3/2002 | Woolard ..................... 362/277 |
| 6,367,949 B1 | | 4/2002 | Pederson | |
| 6,461,008 B1 | | 10/2002 | Pederson | |
| 6,461,009 B2 | | 10/2002 | Smith | |
| 6,547,410 B1 | | 4/2003 | Pederson | |
| 6,592,480 B2 | * | 7/2003 | Evans ......................... 474/118 |

(Continued)

*Primary Examiner*—Thomas M. Sember
(74) *Attorney, Agent, or Firm*—Thompson Coburn LLP

(57) ABSTRACT

A plurality of support casings for light emitting diode warning lights are driven in synchronous arc movements by a belt and pulley drive system having a compact construction with four belt segments.

21 Claims, 7 Drawing Sheets

U.S. PATENT DOCUMENTS 6,971,770 B2 * 12/2005 Rasmussen et al. ........ 362/293
2002/0036908 A1    3/2002 Pederson
2003/0021121 A1    1/2003 Pederson
2003/0031028 A1    2/2003 Murray et al.

* cited by examiner

OSCILLATING BELT AND PULLEY DRIVE SYSTEM FOR HIGH PERFORMANCE LIGHT EMITTING DIODE WARNING LIGHT ASSEMBLY

This Patent Application is a Continuation-In-Part of application Ser. No. 10/713,308, which was filed on Nov. 14, 2003 now U.S. Pat. No. 7,131,757.

BACKGROUND OF THE INVENTION (1) Field of the Invention

The present invention pertains to a drive system for a holder and heat sink for high performance, light emitting diode warning lights. In particular, the present invention pertains to a plurality of support casings for light emitting diode warning lights and their optics, where the support casings are driven by a belt and pulley drive system that converts the rotation of an input shaft to oscillating movements of the plurality of support casings.

(2) Description of the Related Art

Since the invention of the rotating beacon in the 1940's, a large number of emergency and service vehicles have been protected by warning lights that use an incandescent lamp. In these systems, the lamp is given the appearance of flashing by a rotating reflector positioned adjacent the lamp inside the warning light. The reflector is rotated about the lamp and produces a rotating, reflected light arc of coverage that provides a level of warning within a specified zone around the vehicle.

More recently, emergency and service vehicles have employed warning signal lights comprising light emitting diodes (LEDs). In most emergency warning light applications employing LEDs, it is necessary to use an optic placed in front of the LED. The optic, typically a lens and reflector, focuses the light output of the LED and concentrates and directs the light output into the particular area needed to provide visual protection to the emergency vehicle. Therefore, a typical emergency warning light assembly is comprised of a mounting structure, the LED, and the optic in proper alignment.

At the present time, some of the highest performance, commercially available light emitting diodes are built on circuit boards incorporating an aluminum base. The aluminum base permits cooling of the LED chip by conduction of the heat generated by the LED chip through the aluminum base to a metallic structure on which the base is mounted. LED assemblies of this type are commonly called "stars" because of the star shape of the aluminum base. The cooling of the LED chip is critical to the operation of the emergency warning light because the light output of the LED is substantially reduced as the temperature of the LED chip increases. In addition, the LED chip could suffer terminal failure at about 120° C.

Since the beginning of the use of light emitting diodes in emergency vehicle warning lights, their performance has continuously improved and is currently at or above 55 lumens per watt for colors such as red-orange. It has been observed that, given the forward voltage requirement of about 3 volts per LED and the voltage drop through the control electronics of a typical warning signal light, a string of LEDs in series is typically used to achieve maximum electrical efficiency on a 12 volt automotive electrical system. LEDs with a 1-watt rating typically operate at 350 milliamps. Thus, in a 12-volt automotive electrical system, the same electrical energy is required to operate one LED, two LEDs connected in series, or three LEDs connected in series. For emergency vehicle applications, it is therefore desirable to employ two or three LEDs connected in series in the warning signal lights of the vehicle. However, with the LEDs connected in series, if one of the LEDs goes out, the other LEDs go out as well. Given the substantial cost of each LED, currently between $5.00 and $10.00 apiece, it is very desirable to be able to replace, in the field, a single failed LED of a series string of LEDs in an emergency vehicle warning signal light.

To further enhance the visibility of emergency vehicle warning light assemblies, engineered systems of the high-performance warning lights have been developed. In these systems, each warning light is oscillated through an arc of movement. This moves the warning light through a zone of light projection, where the light projection is at a relatively uniform level as the light is oscillated through the middle portion of the arc of movement, and where the light projection appears to spike in intensity as the oscillating light assembly reverses its direction of movement at the opposite ends of the arc of movement.

However, in some applications the zone of light projection generated by an oscillating warning light assembly is not appropriate. In some cases it is more desirable to also have a spike in the intensity of the light projection at the mid-point of the zone of projection. This can be accomplished by employing two warning light assemblies driven by a common power source but in different synchronized arc segments. In the two synchronized arc segments of movement of the two light assemblies, each of the light assemblies is directed in substantially the same direction at one end of the arc of movement and each of the light assemblies is directed in substantially opposite directions at the opposite end of the arc of movement. An oscillating signal light apparatus that could produce these two synchronized zones of oscillating light movement through a simplified drive system construction that does not require a significant amount of space on the emergency vehicle would be very desirable.

SUMMARY OF THE INVENTION

The present invention overcomes the disadvantages associated with emergency vehicle warning signal lights employing two, three, or more LEDs by providing a signal light supporting apparatus that enables easy replacement of failed LEDs while also functioning as a heat sink for the LEDs.

The signal light supporting apparatus provides a secure mounting for one or more of the LEDs, and provides a secure, removable attachment of an optic to each of the individual LEDs. The supporting apparatus functions as a thermally conductive path for the individual LEDs to dissipate the heat generated by the LEDs, and thereby maximizes the light output and prevents the failure of the LEDs caused by excessive heat. A removable attachment of the LEDs and their optics to the light supporting apparatus permits the easy replacement of individual LEDs should one fail when the other LEDs in the series connection have not failed.

The signal light supporting apparatus of the invention is basically comprised of one or more support casings, one or more electronic circuit members having an LED, an optic for the LED of each electronic circuit member, and a spring brace for each optic and electronic circuit member that removably holds the optic and electronic circuit member to the support casing.

The preferred embodiment of the signal light supporting apparatus employs two support casings. However, a single support casing or other numbers of support casings could be used. Each support casing is constructed of a thermally conductive material, for example a metal. It has an elongate configuration with a rectangular rear wall. A pair of side walls project outwardly from opposite side edges of the rear wall, defining a spacing between the side walls and in front of the rear wall. Each of the side walls projects outwardly from the rear wall to a forward edge of the side wall. A plurality of notches are formed in the forward edges of the side walls. The notches of the two side walls are positioned opposite each other. Holes are provided in the side walls adjacent the notches. Pluralities of posts project outwardly from the rear wall into the space defined by the side and rear walls. The posts are arranged in pairs that are centered between the pairs of side wall notches.

When two support casings are employed in the signal light supporting apparatus, a back plate connects the rear walls of the two support casings. The back plate positions the side walls of the two support casings parallel to each other. However, other arrangements of multiple support casings could be used.

One or more electronic circuit members, each having an LED, is mounted to the rear wall of the support casing. In the preferred embodiment, the electronic circuit member is a "star" type member described earlier, and comprises an LED chip with a metallic mounting base having a shape having holes or segments of holes spaced opposite each other. The electronic circuit members are electrically connected in series. Each of the electronic circuit members is removably mounted to the support casing rear wall by being inserted between and engaging between a pair of the posts that project from the rear wall.

One or more optics are mounted to the support casing. The number of optics depends on the number of LEDs mounted to the support casing. Each of the optics has a general conical shape. A small, recessed concave surface at the apex of each conically shaped optic is positioned against the convex surface of the light emitting diode of each electronic circuit member. The circular base of the conically shaped optic is received in a pair of opposed notches or holes in the forward edges of the support casing side walls. This properly orients the optic for focusing and projecting the light of the LED outwardly from the support casing.

A spring brace is employed to removably hold each optic and its associated electronic circuit member to the support casing. The number of spring braces employed corresponds to the number of optics and LED electronic circuit members employed. The spring base is a wire spring having a general U-shaped configuration with opposite ends and a small center projection bent into the middle of the U-shaped spring. The spring brace is removably attached to the support casing by positioning the center projection in the concavity of the optic, and positioning the opposite ends of the spring in the pair of holes in the opposite side walls of the support casing. With the spring brace removably holding the optic against the electronic circuit member and holding the electronic circuit member against the rear wall of the support casing, the heat generated by the LED of the electronic circuit member is dissipated through the support casing. In addition, should one of the LEDs fail, the electronic circuit member of the failed LED is easily removed from the support casing by disengaging the opposite ends of the spring brace from their engagement in the holes in the side walls of the support casing and removing the spring brace and optic, breaking the electrical circuit communications, and removing the failed electronic circuit member from the support casing.

This compact oscillating apparatus drives two or more of the signal light support casings in arc movements. The arc movements are synchronized to move in the same directions in one embodiment, or in opposite directions in a second embodiment. The oscillating apparatus is basically comprised of a driver wheel that is driven by the motive source, and two or more driven wheels that are driven to move through arc segments by the driver wheel. A plurality of belts having a point of positive engagement on each wheel are secured between the driver wheel and the driven wheels. The belts are secured to the driver wheel and then to one of the driven wheels to maintain the synchronous movement of the signal light assemblies through their arc segments. In the one embodiment, the belts oscillate the light assemblies in common oscillation directions. In the second embodiment, the belts oscillate the light assemblies in opposite oscillation directions.

BRIEF DESCRIPTION OF THE DRAWING FIGURES

Further features of the invention are set forth in the following detailed description of the preferred embodiment of the invention and in the drawing figures wherein.

Figure 8A:
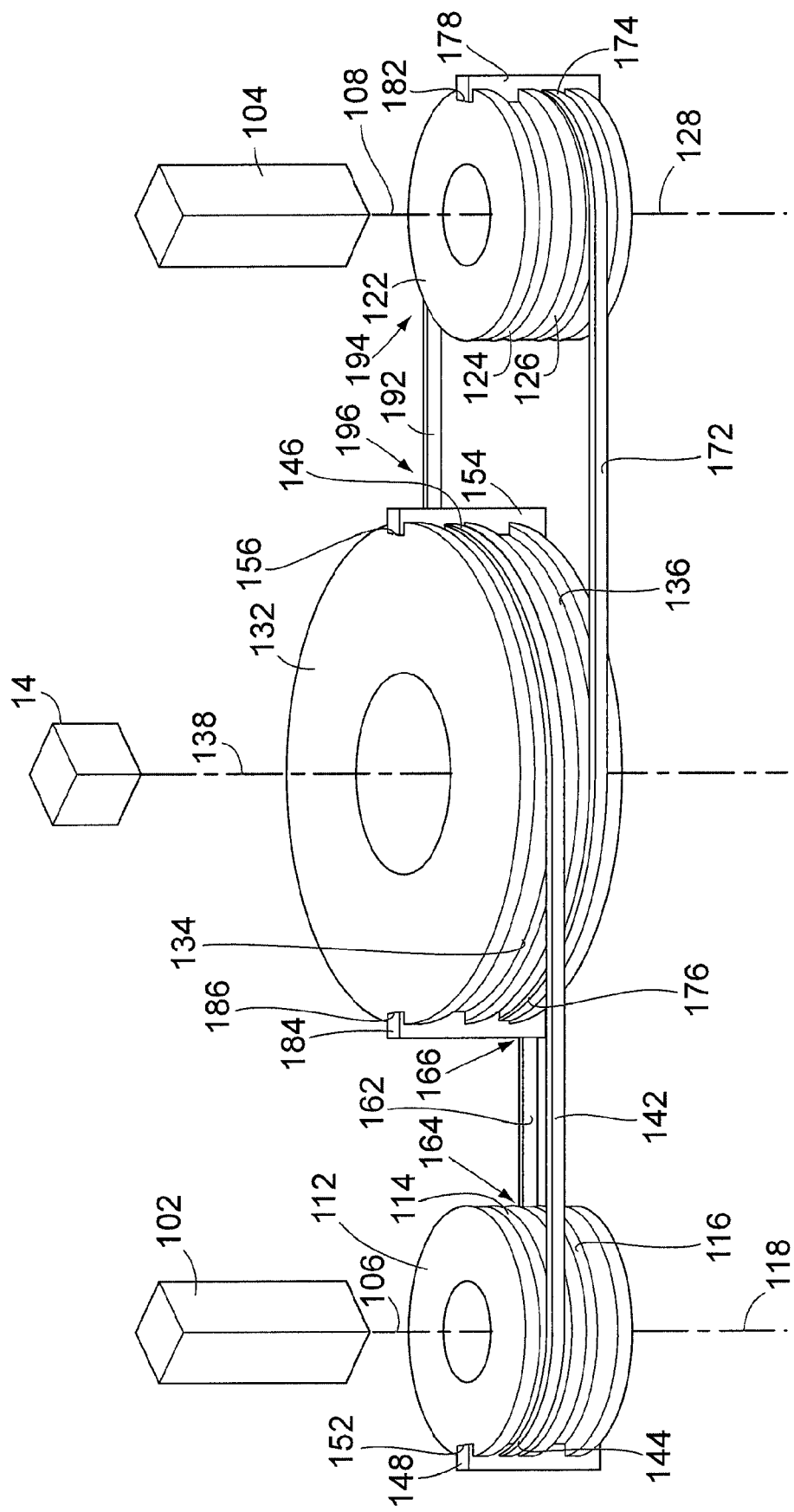
Figure 8B:
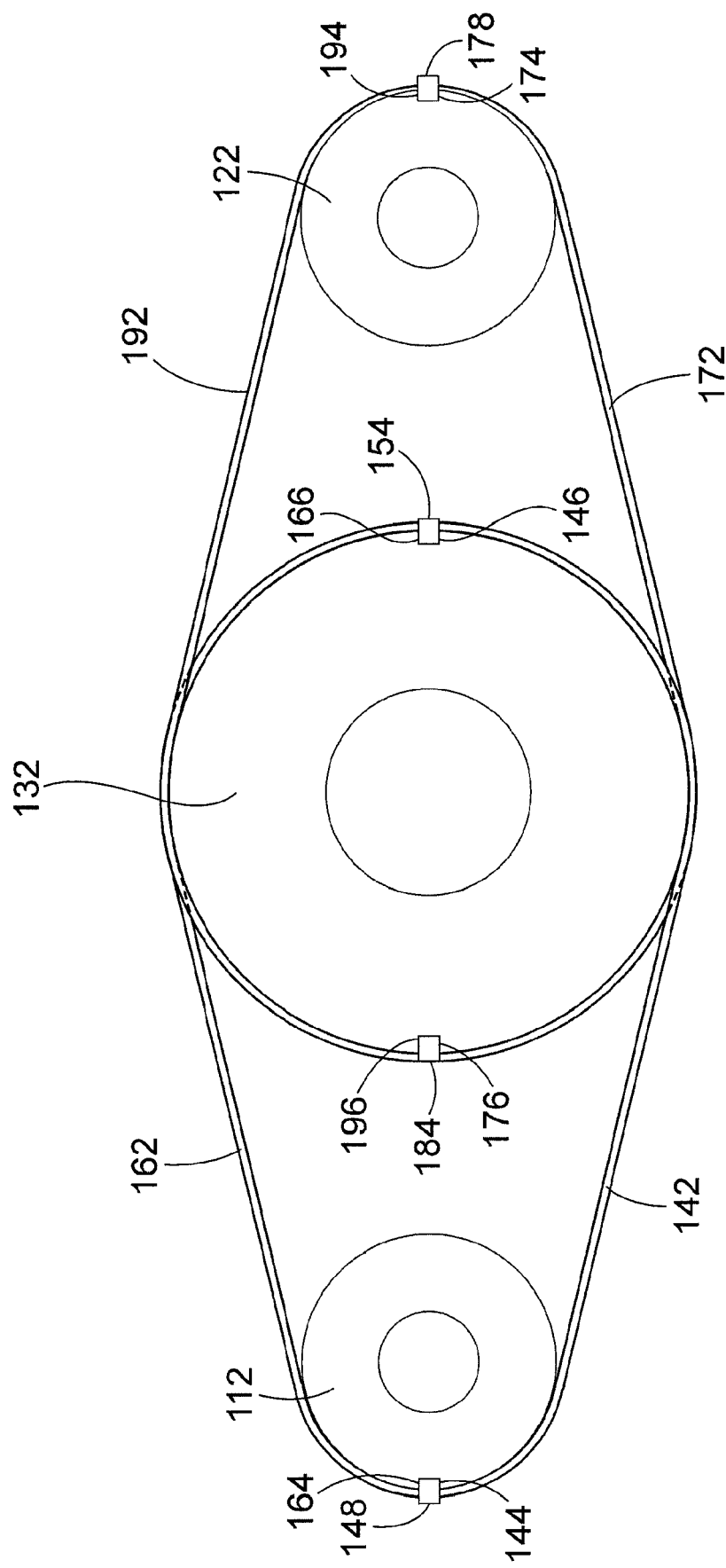
Figure 9A:
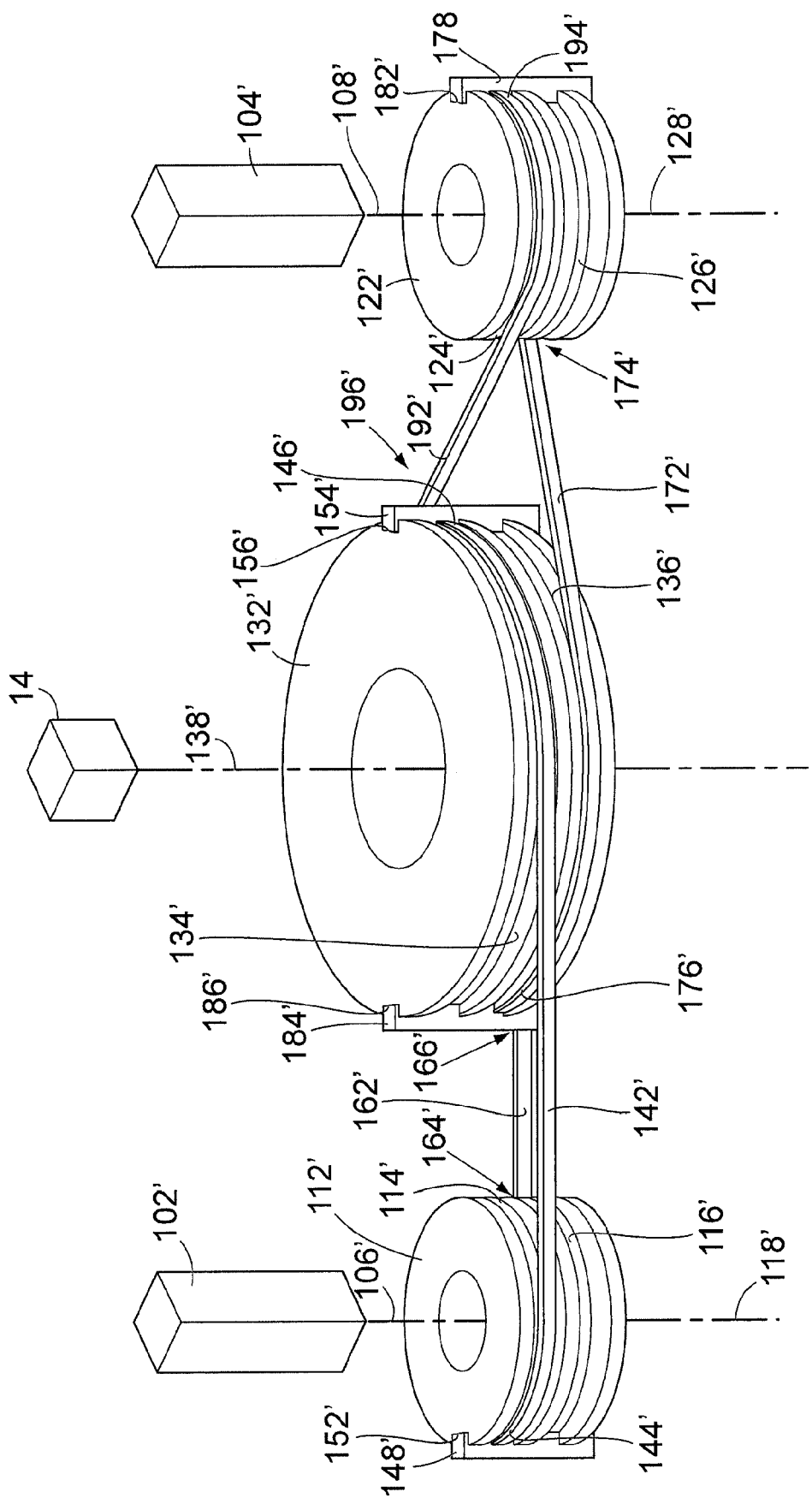
Figure 9B:
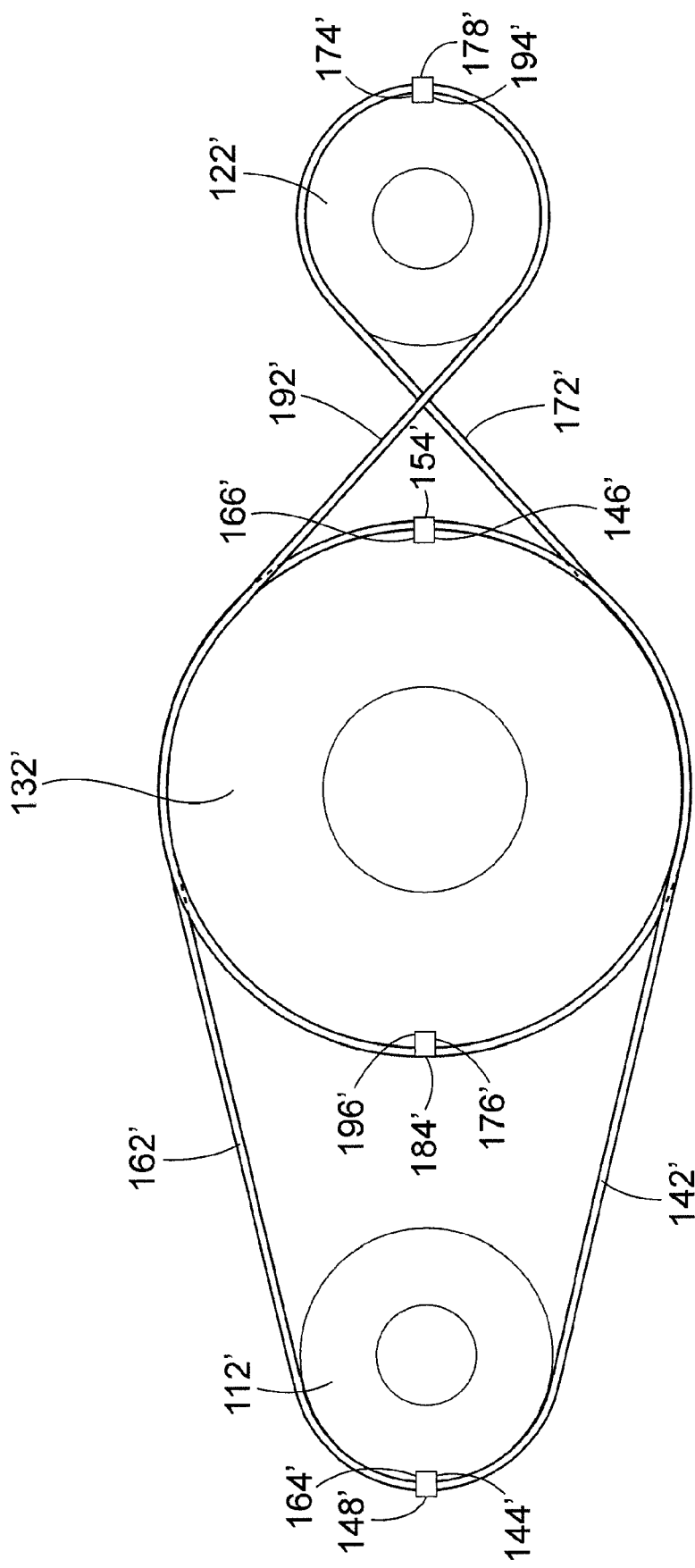

FIGS. 8A and 8B show a simplified schematic representation of the oscillating signal light drive apparatus where the signal light assemblies are driven in a common oscillation direction; and FIGS. 9A and 9B show a simplified schematic representation similar to that of FIGS. 8A and 8B, but showing the oscillating signal light drive apparatus where the signal light assemblies are driven in opposite oscillation directions.

DETAILED DESCRIPTION OF A PREFERRED EMBODIMENT

Figure 1:
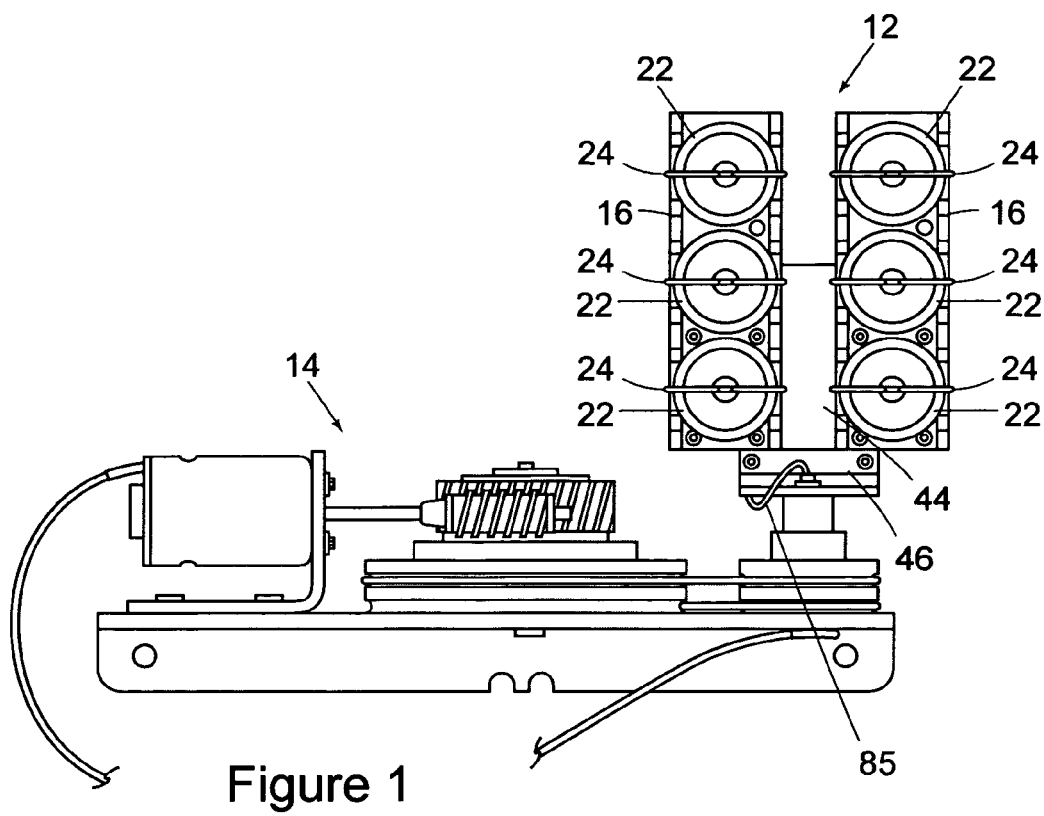
FIG. 1 is a front elevation view of the signal light supporting apparatus of the invention mounted to a motive source that oscillates the apparatus.

FIG. 1 shows the apparatus of the present invention 12 mounted on a motive source 14. The motive source shown is only one example of a motive source that may be used with the apparatus of the invention. The motive source 14 is of a type disclosed in the U.S. patent of W. Kenneth Menke, U.S. Pat. No. 5,842,768, titled Signal Light Oscillating Mechanism, incorporated herein by reference. This type of motive source 14 oscillates the apparatus of the invention 12 through an arc of movement. Again, other types of motive sources may be employed with the apparatus 12.

The signal light supporting apparatus 12 of the invention is basically comprised of one or more support casings 16, one or more electronic circuit members 18 each having an LED, an optic 22 and a spring brace 24.

In the preferred embodiment of the signal light supporting apparatus 12, two support casings 16 are employed. The two support casings 16 are identical to each other. However, in other applications, one support casing could be used, or three or more support casings could be used.

Figure 2:
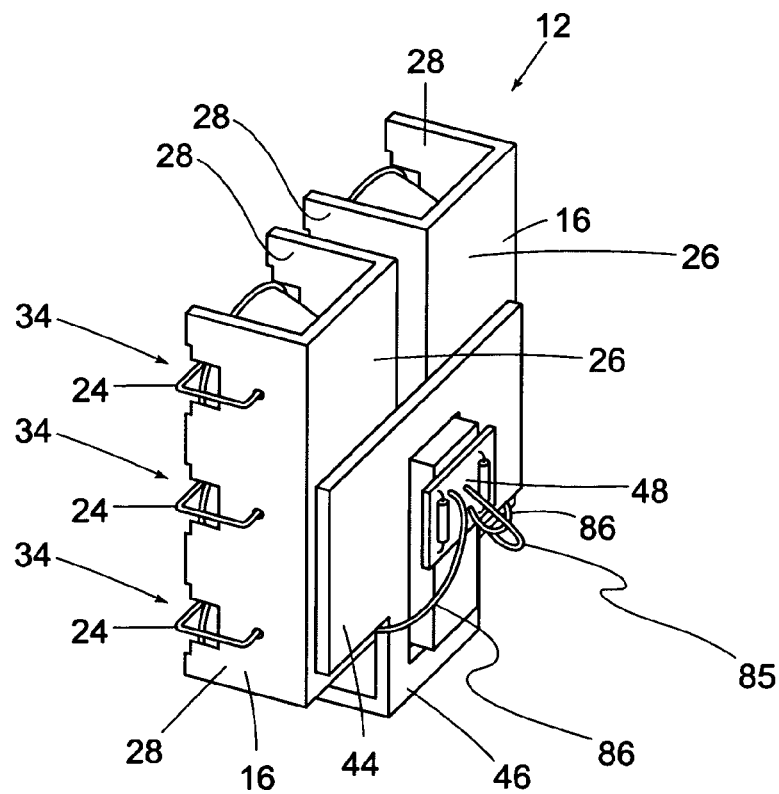
FIG. 2 is a rear perspective view of the apparatus removed from the motive source of FIG. 1.
Figure 3:
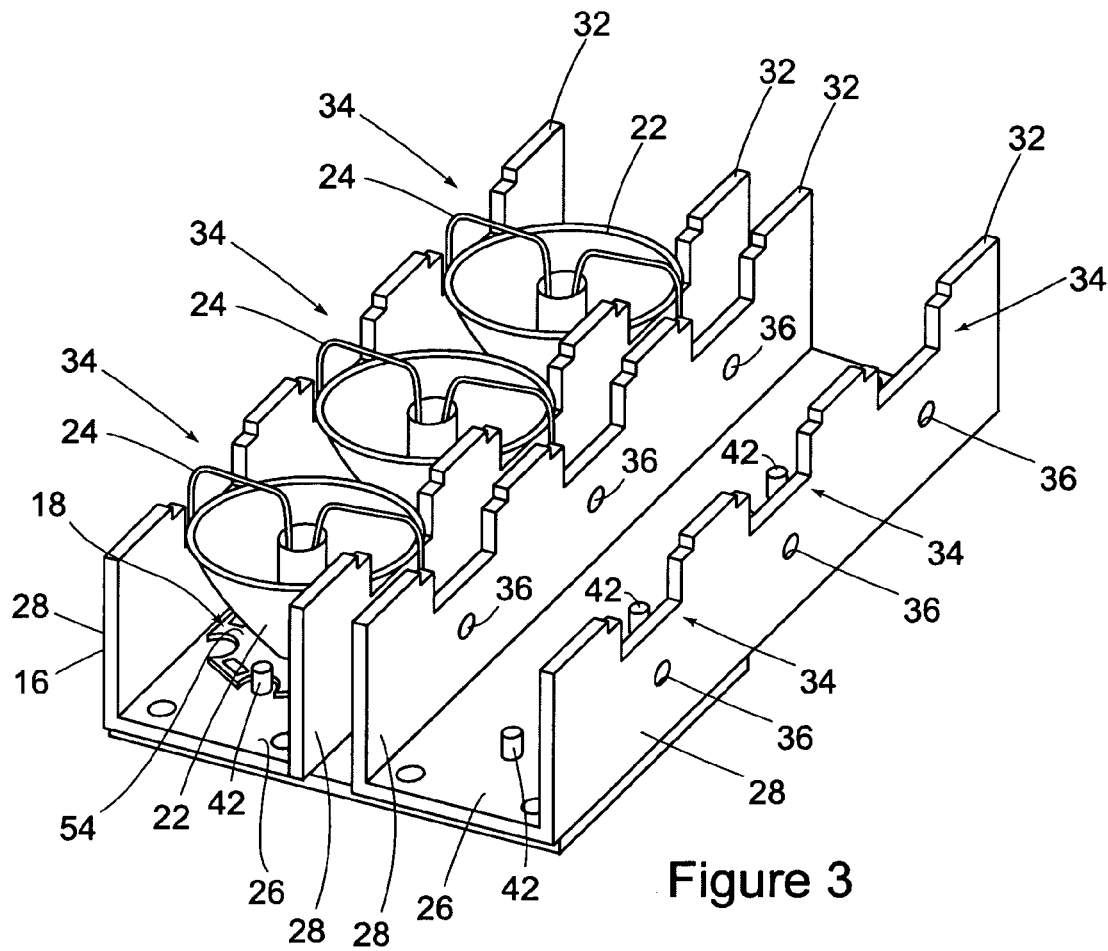
FIG. 3 is a front perspective view of the apparatus with several of the LED assemblies disassembled from the holder.
Figure 4:
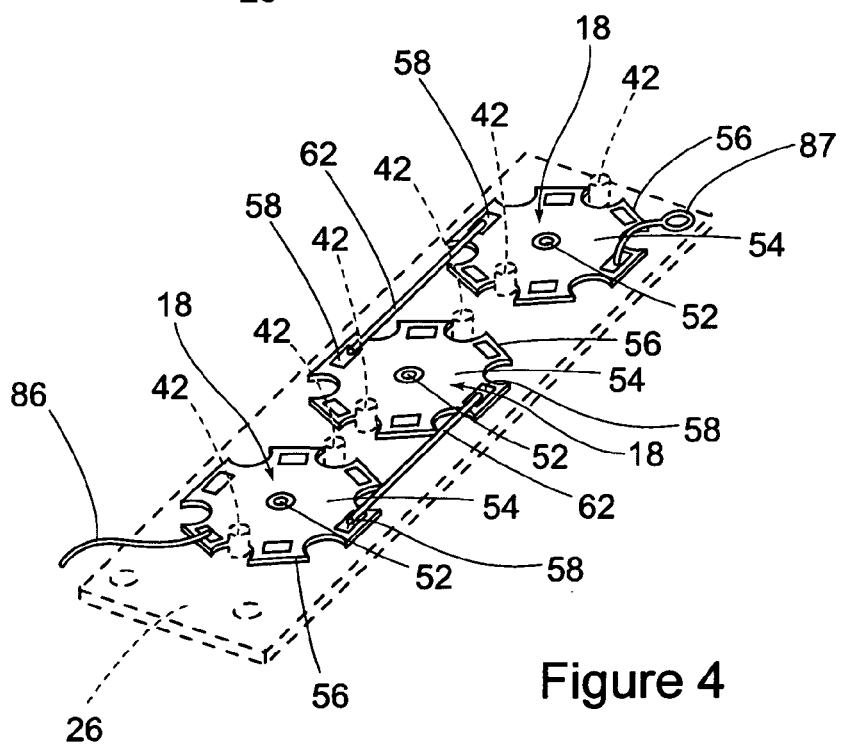
FIG. 4 is a perspective view of the electronic circuit members of the LED assemblies.

As best seen in FIGS. 2 and 3, each support casing has an elongate configuration with a rectangular rear wall 26 and a pair of side walls 28. The rear wall 26 and side walls 28 are all constructed of a thermally conductive material, for example, aluminum. The pair of side walls 28 are parallel to each other and project outwardly from opposite side edges of the rear wall 26 to forward edges 32 of the side walls.

Notches 34 are formed into each of the forward edges 32 of the side walls 28. As best seen in FIG. 3, the notches 34 are arranged in pairs in the side wall forward edges 32 on opposite sides of the rear wall 26.

Holes 36 are formed in each of the side walls 28 adjacent the notches 34. The holes 36 are arranged in pairs on opposite sides of the rear wall 26 and are centered relative to their adjacent notches 34.

Pairs of post 42 project outwardly from the rear wall 26. The pairs of post 42 are arranged in a line that extends along the length of the rear wall 26. Each pair of posts 42 is centered on the rear wall between each of the pairs of notches 34 in the support casing side walls 28.

The two support casings 16 of the apparatus 12 shown in FIGS. 1-3 and 7 are secured together by a back plate 44 that is connected to the rear walls 26 of the two casings. The back plate 44 holds the pairs of side walls 28 of the two support casings 16 in a side by side relationship to each other. An angled portion 46 of the back plate projects downwardly and forwardly from the back plate 44. The angled portion 46 is employed in mounting the apparatus 12 to the motive source 14 described earlier. As shown in FIG. 2, the back plate 44 also supports an electronic circuit board 48 that controls the electrical current supplied to the signal lights of the apparatus. Unregulated electrical power is supplied to the circuit board 48 through a wire 85 and regulated current is supplied to the series string of electronic circuit members 18 through additional wires 86. A boost type regulator could be used to supply regulated current to more than three LEDs that could be mounted elsewhere.

The side by side positioning of the support casings 16 shown in FIGS. 1-3 and 7 is only one example of the possible relative positions of the support casings 16. In addition, as explained earlier, more than the two support casings 16 may be employed in a signal light supporting apparatus, with the support casings 16 being positioned in a variety of different relative positions.

One or more of the electronic circuit members 18 are removably mounted to the rear wall 26 of each support casing 16. In the embodiment shown in the drawing figures, three electronic circuit members 18 are mounted to the rear wall 26. Each electronic circuit member 18 is a "star" type circuit member described earlier. Each of the electronic circuit members 18 has a light emitting diode (LED) 52 at its center. The LED has a slightly convex surface. The metallic mounting base 54 has a plurality of projecting arms 56 that give the electronic circuit member 18 the star shaped configuration. Electrical contacts 58 are provided on the arms 56 of the circuit members 18. Electrically conductive connections 62 are provided between the electrical contacts 58 of the adjacent circuit members, connecting the three circuit members in a series connection, the last of which is connected to a common ground by ground straps 87. The three electronic circuit members 18 shown in the illustrated example are also connected with the electronic circuit board 48 for controlling illumination of the LEDs.

Each of the electronic circuit members 18 is removably mounted to the support casing 16 by being inserted between and engaging between a pair of the posts 42 that project outwardly from the support casing rear wall 26. The base 54 of each electronic circuit member 18 engages against the rear wall 26, thereby enabling heat transfer from the base to the rear wall. The engagement of the pair of posts 42 with the opposite sides of the base 54 also conducts heat to the rear wall 26. The pairs of posts 42 removably hold the electronic circuit members 18 to the rear wall, preventing movement of the circuit members across the surface of the rear wall. The positioning of each pair of posts 42 in the spacings between adjacent arms 56 of each circuit member base 54 enables the circuit members 18 to be easily removed from between the pairs of posts by pulling the circuit members 18 away from the rear wall 26 when replacement is needed.

Figure 5:
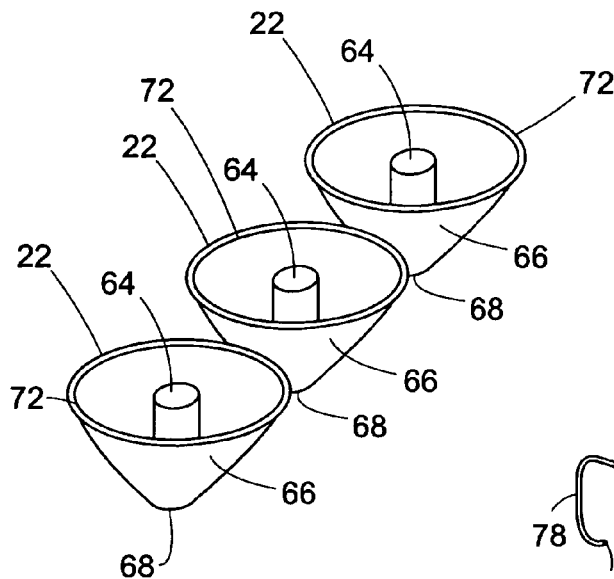
FIG. 5 is a perspective view of several of the optics of the LED assemblies.

A number of optics 22 corresponding to the number of circuit members 18 are mounted to the support casings 16. As seen in FIG. 5, each of the optics 22 has a general conical shape and comprises a focusing center lens 64 and a parabolic reflector 66 that surrounds the lens. A small recessed concave surface is provided on the lens 64 at the apex 68 of each optic 22.

Each optic 22 has a circular edge 72 opposite the apex 68. The apex 68 of each optic 22 is positioned against the convex surface of the LED 52 of each of the electronic circuit members 18. This positions portions of the conical exterior surface of the optic 22 in one of the pairs of notches 34 formed in the side walls 28 of the support casings 16. The engagement of the concave surface at the optic apex 68 against the LED, and the positioning of the optic exterior surface in the opposed pairs of notches 34 in the support casing side walls 28 positively positions each of the optics 22 adjacent its associated LED 52 in the support casing 16. This properly orients each of the optics 22 in the support casing 16 for focusing and projecting the light of each LED 52 outwardly from the support casing.

Figure 6:
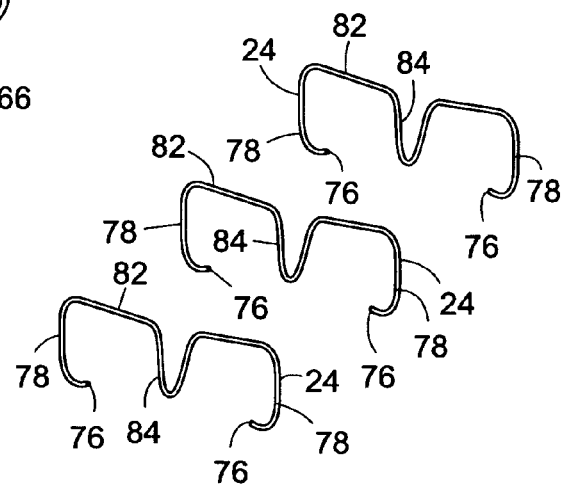
FIG. 6 is a perspective view of several of the spring braces that hold the optics and electronic circuit members to the support casing.
Figure 7:
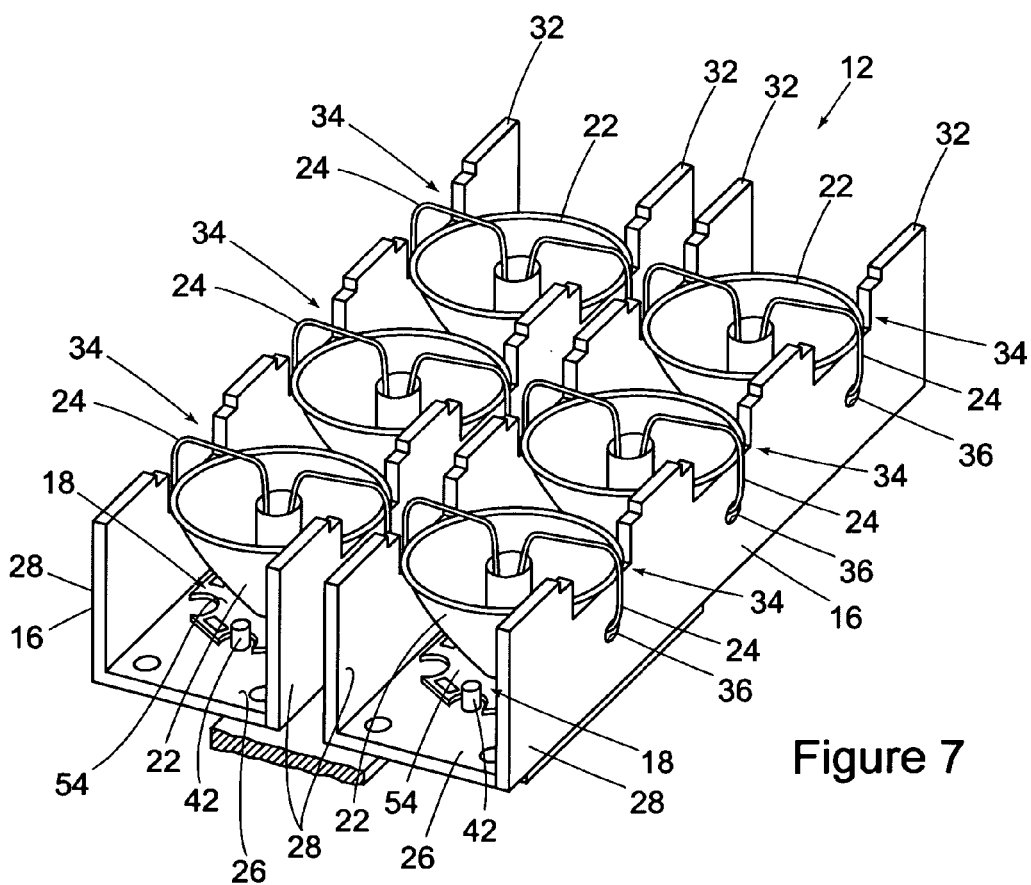
FIG. 7 is a front perspective view of the apparatus removed from the motive source of FIG. 1.

Each of the spring braces 24 shown in FIG. 6 is employed in removably holding each optic 22 and its associated electronic circuit member 18 to the support casing 16. The number of spring braces 24 employed corresponds to the number of optics 22 and to the number of electronic circuit members 18 mounted on the support casing 16. As shown in FIG. 6, each spring brace 24 is a wire spring having a length with opposite in-turned ends 76. The wire spring has a general U-shaped configuration. Side portions 78 of the wire spring extend parallel to each other from the in-turned ends 76 to a middle portion 82 of the spring that connects the two side portions 78. A small center projection 84 is bent into the middle portion 82 of the spring. The flexibility and resiliency of the spring brace 24 enables it to be removably attached to the support casing 16 without the use of separate fasteners.

In assembling the apparatus of the invention, the series connected electronic circuit members 18 are first removably mounted on the support casing 16 by positioning each base 54 of a circuit member between a pair of post 42 on the support casing rear wall 26, as described earlier. The optics 22 are then mounted on their associated circuit members 18 by positioning the concave surface at each optic apex 68 against the convex surface of the LEDs 52 of the circuit members 18. Each spring brace 24 is then mounted over an optic 22 by flexing the opposite ends 76 of the brace away from each other, and then positioning the opposite ends 76 over the support casing side walls 28 and into the holes 36 in the side walls. Releasing the spring braces 24 allows their resiliency to cause the spring brace ends 76 to removably engage in the holes 36. As each spring brace 24 is positioned over the support casing side walls 28, the center projection 84 of the spring brace extends into the optic lens 64. With the spring braces 24 in their positions shown in FIG. 7, the spring braces 24 solely removably hold the optics 22 and the electronic circuit members 18 to the support casing 16.

With the spring braces 24 removably holding the optics 22 against the electronic circuit member 18 and holding the electronic members 18 against the rear wall 26 of the support casing 16, the heat generated by the LEDs 52 is transferred from the base 54 of each electronic circuit member 18 to the support casing rear wall 26, dissipating the heat from the electronic circuit member 18 through the support casing 16. In addition, should one of the LEDs 52 fail, the electronic circuit member 18 of the failed LED can be easily removed from the support casing 16 by disengaging the opposite ends of the spring brace 24 from their engagements in the holes 36 of the casing side walls 28, and removing the spring brace 24, the optic 22 and the failed electronic circuit member 18 to enable replacement of the electronic circuit member.

The signal light supporting apparatus 12 described above provides a secure mounting for one or more of the LEDs 52 and their associated optics 22, and provides a removable attachment of the LEDs 52 and their optics 22 that enables easy replacement of a failed LED. The supporting apparatus 12 also functions as a heat sink providing a thermally conductive path for the individual LEDs to dissipate the heat generated by the LEDs and thereby maximize the light output and prevent the failure of the LEDs caused by excessive heat.

FIGS. 8A and 8B show a simplified schematic representation of an oscillating signal light drive apparatus where two signal light assemblies are synchronously driven in a common oscillation direction. In the drive system embodiment shown in FIGS. 8A and 8B, a pair of the signal light apparatus are shown schematically as a first signal light 102 and a second signal light 104. The first and second signal lights 102,104 are part of an emergency warning light assembly such as that disclosed in the earlier referenced U.S. Pat. No. 5,842,768. To simplify the description of the drive system of the invention, the details of the emergency warning light assembly are omitted from FIGS. 8A and 8B.

Each of the signal lights 102, 104 are supported in the emergency warning light assembly for oscillating movements about a first signal light axis 106 and a second signal light axis 108, respectively. The first and second signal light axes 106, 108 are parallel to each other.

The first signal light 102 is operatively connected to a first driven member 112 that drives the signal light 102 in oscillating movements about the first signal light axis 106. The first driven member 112 has the form of a driven wheel or a driven pulley, having an upper circumferential groove 114 and a lower circumferential groove 116. The terms "upper" and "lower" should not be interpreted as limiting. These terms are used only to describe the relative positions of the two grooves 114,116 in the generally horizontal orientation of the first driven member shown in FIGS. 8A and 8B. The first driven member 112 is mounted in the light assembly (not shown) for rotational movement around an axis 118 of the first driven member. In a preferred embodiment, the first driven member axis 112 is parallel with the first signal light axis 106, and is more preferably coaxial with the first signal light axis.

A second driven member 122 in the form of a driven wheel or a driven pulley is also provided in the drive system. The second driven member 122 is substantially the same in construction as the first driven member 112. Thus, the second driven member 122 has an upper groove 124, a lower groove 116, and a center rotational axis 128. The second driven member axis 128 is preferably parallel with the second signal light axis 108, and is more preferably coaxial with the second signal light axis. In addition, the second driven member axis 128 is parallel with the first driven member axis 118.

A drive member 132 is positioned between the first driven member 112 and the second driven member 122. The drive member 132 is provided in the form of a drive wheel or drive pulley. In the embodiment shown in FIG. 8, the drive member 132 is dimensioned larger than the first driven member 112 and the second driven member 122. Like the first and second driven members, the drive member 132 is provided with an upper groove 134 and a lower groove 136 that extend completely around the circumference of the drive member. The drive member 132 is rotatable around a center drive member axis 138. The drive member axis 138 is parallel to the first driven member axis 118 and the second driven member axis 128. As shown in FIG. 8, the drive member axis 138 is positioned in a common plane with the first driven member axis 118 and the second driven axis 128. In variant embodiments of the drive system, the drive member axis 138 is positioned out of the plane occupied by the first driven member axis 118 and the second driven axis 128.

A motive source 14 is operatively connected to the drive member 132 to move the drive member about the drive member axis 138. The motive source moves the drive member 132 in oscillating movements through an arc segment. The motive source could be the same as that disclosed in the earlier referenced U.S. Pat. No. 5,842,768. Because the motive source is known in the art, it is shown schematically in FIGS. 8A and 8B in order to simplify the representation of the drive system.

A first belt 142 having a length with opposite driven 144 and drive 146 ends extends between the first driven member 112 and the drive member 132. In the drive system of the invention, the first belt 142, as well as the additional belts to be described, are not formed in the continuous loop configuration as is typical in belts used in belt and pulley drive systems. Because of the particular arrangements of the belts of the drive system to be described, continuous loop belts could not be used in the drive system.

The first belt driven end 144 is positioned in the first driven member upper groove 114 and is secured in place by a first driven member key 148 that is received in an axial slot 152 of the first driven member 112. Other means of securing the first belt driven end 144 stationary to the first driven member 112 could also be used.

The first belt drive end 146 is received in the drive member upper groove 134 and is secured in place by a first drive member key 154 that is received in a first axial slot 156 in the drive member. Other means of securing the first belt drive end 146 stationary to the drive member 132 could also be used.

A second belt 162 having a length with opposite driven 164 and drive 166 ends extends between the first driven member 112 and the drive member 132. As seen in FIG. 8A and FIG. 8B, the second belt 162 is positioned on an opposite side of the first driven member 112 and the drive member 132 from the first belt 142. The second belt driven end 164 is positioned in the first driven member lower groove 116, and the second belt drive end 166 is positioned in the drive member lower groove 136. The second belt driven end 146 is secured to the first driven member 112 by the first driven member key 148, and the second belt drive end 166 is secured to the drive member 132 by the first drive member key 154. The connections of the first belt 142 and second belt 162 to the first driven member 112 and the drive member 132 provide an axial spacing between the first belt 142 and the second belt 162.

A third belt 172 having a length with opposite driven 174 and drive 176 ends extends between the second driven member 122 and the drive member 132. The third belt driven end 174 is positioned in the second driven member lower groove 126 and the third belt drive end 176 is positioned in the drive member lower groove 136. The third belt driven end 174 is secured to the second driven member 122 by a second driven member key 178 that is received in an axial slot 182 in the second driven member. The third belt drive end 176 is secured in the drive member lower groove 136 by a second drive member key 184 that is received in a second axial slot 186 in the drive member. The second driven member key 178 and the second drive member key 184 secure the respective third belt driven end 174 and drive end 176 to the respective second driven member 122 and the drive member 132. Other equivalent means of securing the ends of the third belt 172 to the second driven member 122 and the drive member 132 could also be employed.

A fourth belt 192 having a length with opposite driven 194 and drive 196 ends also extends between the second driven member 122 and the drive member 132. The fourth belt driven end 194 is positioned in the second driven member upper groove 124 and the fourth belt drive end 196 is positioned in the drive member upper groove 134. The second driven member key 178 secures the fourth belt driven end 194 to the second driven member 122, and the second drive member key 184 secures the fourth belt drive end 196 to the drive member 132. As seen in FIG. 8, the fourth belt 192 is axially spaced from the third belt 172.

The connections of the first, second, third, and fourth belts 142, 162, 172, 192 between the first driven member 112, the second driven member 122 and the drive member 132 provide an oscillating drive system that is compact in construction and drives the two signal lights 102, 104 in arc movements that are sequenced to move in the same directions. When the motive source 14 such as that disclosed in the earlier referenced U.S. Pat. No. 5,842,768 drives the drive member 132 through an arc segment of movement, the belts 142, 162, 172, 192 cause the first driven member 112 and second driven member 122 to also move in the same direction of rotation through an arc segment. Because the four belts 142, 162, 172, 192 are secured stationary to the drive member 132 and the first and second driven members 112, 122, there is no slippage of the belts and the two driven members 112, 122 move in synchronous oscillations through arc movements. The use of the four belts 142, 162, 172, 192 instead of two continuous loop belts enables the drive system to be constructed in an axially compact configuration with only two circumferential grooves on each of the drive member 132, the first driven member 112 and the second driven member 122.

FIGS. 9A and 9B show a variant embodiment of the drive system of FIGS. 8A and 8B in which the drive members are oscillated in arc segments in opposite directions. The component parts of the drive system of FIGS. 9A and 9B are the same as those of FIGS. 8A and 8B, and therefore the same reference numbers used in identifying the component parts of FIGS. 8A and 8B are also used in FIGS. 9A and 9B except that the reference numbers in FIGS. 9A and 9B are followed by a prime (').

In viewing FIG. 9 it can be seen that the only difference in construction of the drive system from that of FIG. 8 is that the third belt 172' and fourth belt 192' cross each other between the drive member 132' and the second driven member 122'.

The drive system of FIG. 9 provides a compact oscillating construction that drives the two driven members 112', 122' and their associated signal lights 102', 104' in arc movements that are synchronized to move in opposite directions. As in the FIG. 8 embodiment, securing the belts to the two driven members 112', 122' and the drive member 132' prevents belt spillage and ensures that the driven members oscillate in synchronous arc movements in opposite directions.

Although the apparatus of the invention has been described above by reference to particular embodiments, it should be understood that modifications and variations could be made to the invention without departing from the scope of protection provided by the following claims.

What is claimed is:

1. An oscillating signal light apparatus comprising:
a signal light having a signal light axis, the signal light being movable about the signal light axis;
a driven member having a driven member axis, the driven member being movable about the driven member axis, the driven member being operatively connected with the signal light to cause the signal light to move about the signal light axis in response to the driven member moving about the driven member axis;
a drive member having a drive member axis, the drive member being movable about the drive member axis;
a first belt having a length that is not a continuous loop and has opposite driven and drive ends, the first belt driven end being secured to the driven member and the first belt drive end being secured to the drive member;
a second belt having a length that is not a continuous loop and has opposite driven and drive ends, the second belt driven end being secured to the driven member and the second belt drive end being secured to the drive member; and
a motive source operatively connected to the drive member to move the drive member about the drive member axis and thereby move the driven member about the driven member axis and move the signal light about the signal light axis.

2. The apparatus of claim 1, further comprising:
the first belt driven end and the second belt driven end being axially spaced on the driven member.

3. The apparatus of claim 2, further comprising:
the first belt drive end and the second belt drive end being axially spaced on the drive member.

4. The apparatus of claim 1, further comprising:
the driven member having a pair of axially spaced grooves with the first belt driven end being secured in one groove and the second belt driven end being secured in an other groove.

5. The apparatus of claim 4, further comprising:
the drive member having a pair of axially spaced grooves with the first belt drive end secured in one of the drive member grooves and the second belt drive end being secured in an other of the drive member grooves.

6. The apparatus of claim 1, further comprising:
the first belt being positioned in a first plane with the driven member axis and the drive member axis being perpendicular to the first plane; and
the second belt being positioned in a second plane with the driven member axis and the drive member axis being perpendicular to the second plane.

7. The apparatus of claim 6, further comprising:
the first plane and the second plane being parallel and axially spaced from each other.

8. The apparatus of claim 1, further comprising:
the first belt crossing the second belt between the driven member and drive member.

9. The apparatus of claim 1, further comprising:
the driven member being a first driven member of a pair of first and second driven members, the second driven member having a second driven member axis and the second driven member being movable about the second driven member axis;
a third belt having a length with opposite driven and drive ends, the third belt driven end being secured to the second driven member and the third belt drive end being secured to the drive member; and,
a fourth belt having a length with opposite driven and drive ends, the fourth belt driven end being secured to the second driven member and the fourth belt drive end being secured to the drive member.

10. The apparatus of claim 9, further comprising:
the signal light being a first signal light of a pair of first and second signal lights, the second signal light having a second signal light axis and the second signal light being movable about the second signal light axis, the second signal light being operatively connected with the second driven member to cause the second signal light to move about the second signal light axis in response to the second driven member moving about the second driven member axis.

11. The apparatus of claim 10, further comprising:
the first belt crossing the second belt between the first driven member and the drive member.

12. The apparatus of claim 11, further comprising:
the third belt not crossing the fourth belt between the second driven member and the drive member.

13. The apparatus of claim 1, further comprising:
the first belt extending around one side of the driven member and the second belt extending around an opposite side of the driven member.

14. The apparatus of claim 13, further comprising:
the first belt extending around one side of the drive member and the second belt extending around an opposite side of the drive member.

15. An oscillating signal light apparatus comprising:
a signal light having a signal light axis, the signal light being movable about the signal light axis;
a driven member having a driven member axis, the driven member being movable about the driven member axis, the driven member being operatively connected with the signal light to cause the signal light to move about the signal light axis in response to the driven member moving about the driven member axis;
a drive member having a drive member axis, the drive member being movable about the drive member axis;
a first belt that is not a continuous loop and has a length that extends between and engages with the driven member and the drive member;
a second belt that is not a continuous loop and has a length that extends between and engages with the driven member and the drive member, the second belt being separate from the first belt and being axially spaced from the first belt; and,
a motive source operatively connected to the drive member to move the drive member about the drive member axis and thereby move the driven member about the driven member axis and move the signal light about the signal light axis.

16. The apparatus of claim 15, further comprising:
the first belt being positioned in a first plane with the driven member axis and the drive member axis being perpendicular to the first plane; and,
the second belt being positioned in a second plane with the driven member axis and the drive member axis being perpendicular with the second plane.

17. The apparatus of claim 16, further comprising:
the first plane and the second plane being parallel and axially spaced from each other.

18. The apparatus of claim 15, further comprising:
the first belt crossing the second belt between the driven member and drive member.

19. The apparatus of claim 15, further comprising:
the driven member being a first driven member of a pair of first and second driven members, the second driven member having a second driven member axis and the second driven member being movable about the second driven member axis;
a third belt that extends between and engages with the second driven member and the drive member; and
a fourth belt that extends between and engages with the second driven member and the drive member, the fourth belt being separate from the third belt and being axially spaced from the third belt.

20. The apparatus of claim 19, further comprising:
the signal light being a first signal light of a pair of separate first and second signal lights, the second signal light having a second signal light axis and the second signal light being movable about the second signal light axis, the second signal light being operatively connected with the second driven member to cause the second signal light to move about the second signal light axis in response to the second driven member moving about the second driven member axis.

21. The apparatus of claim 20, further comprising:
the third belt crossing the fourth belt between the second driven member and the drive member.

* * * * *